(12) United States Patent
Grelewicz et al.

(10) Patent No.: US 8,914,504 B2
(45) Date of Patent: Dec. 16, 2014

(54) END USER PERFORMANCE MONITORING FOR MOBILE APPLICATIONS

(75) Inventors: Roland Grelewicz, Mentone (AU); Simon Kirsch, East Melbourne (AU)

(73) Assignee: Remasys Pty Ltd, Melbourne (AU)

( * ) Notice: Subject to any disclaimer, the term of this patent is extended or adjusted under 35 U.S.C. 154(b) by 0 days.

(21) Appl. No.: 13/701,725

(22) PCT Filed: Dec. 7, 2011

(86) PCT No.: PCT/AU2011/001579
§ 371 (c)(1),
(2), (4) Date: Dec. 3, 2012

(87) PCT Pub. No.: WO2012/075526
PCT Pub. Date: Jun. 14, 2012

(65) Prior Publication Data
US 2013/0080634 A1    Mar. 28, 2013

Related U.S. Application Data

(60) Provisional application No. 61/451,998, filed on Mar. 11, 2011.

(30) Foreign Application Priority Data

Dec. 8, 2010    (AU) .................................. 2010905389

(51) Int. Cl.
| | | |
|---|---|---|
| G06F 15/173 | (2006.01) |
| H04W 24/00 | (2009.01) |
| H04W 24/06 | (2009.01) |
| G06F 9/44 | (2006.01) |
| H04W 8/18 | (2009.01) |
| G06F 11/34 | (2006.01) |

(52) U.S. Cl.
CPC .............. *H04W 24/00* (2013.01); *H04W 24/06* (2013.01); *G06F 9/44* (2013.01); *H04W 8/183* (2013.01); *G06F 11/3414* (2013.01); *G06F 11/3466* (2013.01); *G06F 11/3419* (2013.01); *G06F 11/3438* (2013.01); *G06F 2201/865* (2013.01)

USPC ............................ 709/224; 709/223; 709/203

(58) Field of Classification Search
USPC ......................................................... 709/224
See application file for complete search history.

(56) References Cited

U.S. PATENT DOCUMENTS

| 5,602,991 A | 2/1997 | Berteau |
| 7,594,183 B2 | 9/2009 | Dreher |

(Continued)

FOREIGN PATENT DOCUMENTS

| AU | 18073/01 A | 6/2001 |
| CN | 1976526 A | 6/2007 |

(Continued)

OTHER PUBLICATIONS

Written Opinion of the ISR (ISA/KR) mailed Jul. 18, 2012, PCT/AU2011/001579.

(Continued)

*Primary Examiner* — Hua Fan
(74) *Attorney, Agent, or Firm* — Banner & Witcoff, Ltd.

(57) ABSTRACT

A system for obtaining end-user performance data associated with a target application executing on a mobile device comprises a management system server computer configured to comprise a virtual execution environment. A mobile device is configured to support operation of a target application executing thereon via the virtual execution environment. The server computer is configured to perform at least one automated operation of the target application by emulating user actions within the virtual execution environment. One or more images are captured of a target application graphical user interface responsive to the emulated user actions from within the virtual execution environment. The images are analyzed to determine performance data of the target application, and the performance data are stored in a memory store.

13 Claims, 5 Drawing Sheets

(56) References Cited

U.S. PATENT DOCUMENTS

| | | | |
|---|---|---|---|
| 7,870,504 B1* | 1/2011 | McIntosh et al. | 715/803 |
| 7,953,847 B2 | 5/2011 | Grelewicz et al. | |
| 2003/0037101 A1* | 2/2003 | Torabi | 709/203 |
| 2003/0065986 A1 | 4/2003 | Fraenkel et al. | |
| 2005/0027871 A1 | 2/2005 | Bradley et al. | |
| 2006/0002407 A1* | 1/2006 | Sakamoto | 370/402 |
| 2006/0059253 A1 | 3/2006 | Goodman et al. | |
| 2006/0059433 A1* | 3/2006 | McGlinchey et al. | 715/771 |
| 2006/0094512 A1* | 5/2006 | Yoshino et al. | 463/47 |
| 2006/0133329 A1* | 6/2006 | Lewis et al. | 370/338 |
| 2006/0161884 A1 | 7/2006 | Lubrecht et al. | |
| 2006/0246910 A1* | 11/2006 | Petermann | 455/444 |
| 2007/0067373 A1* | 3/2007 | Higgins et al. | 707/206 |
| 2009/0228873 A1 | 9/2009 | Drukman et al. | |
| 2010/0088598 A1 | 4/2010 | Lee et al. | |
| 2010/0290390 A1* | 11/2010 | Souissi et al. | 370/328 |
| 2011/0235546 A1* | 9/2011 | Horn et al. | 370/254 |

FOREIGN PATENT DOCUMENTS

| | | |
|---|---|---|
| EP | 2154647 A1 | 2/2010 |
| JP | 11-288382 A | 10/1999 |

OTHER PUBLICATIONS

International Search Report dtd Jul. 18, 2012 PCT/AU2011001579.

Keynote Datasheet, Mobile Quality Test & Measurement, "Mobile Device Perspective", Keynote Systems, Inc., San Mateo, CA, 4 sheets, undated.

* cited by examiner

END USER PERFORMANCE MONITORING FOR MOBILE APPLICATIONS

CROSS REFERENCE TO RELATED APPLICATIONS

This is a U.S. National Stage Application under 35 U.S.C. §371 of International Application No. PCT/AU11/001,579, filed Dec. 7, 2011, which was published Under PCT Article 21(2), and which claims priority to U.S. provisional application No. 61/451,998 filed Mar. 11, 2011 and Australian Provisional Application No. 2010905389, filed Dec. 8, 2010, the entire contents of which are incorporated herein by reference.

FIELD OF THE INVENTION

The present invention relates to mobile applications, and in particular to a method and system for monitoring the end-user experience of mobile data service applications executing on devices such as smartphones, tablet PCs, and other mobile/portable computing apparatus.

BACKGROUND OF THE INVENTION

The evolution of mobile data services and technologies has resulted in the availability of greater bandwidth, such as that provided by $3^{rd}$-Generation (3G) wide area mobile and telephone networks.

At the same time, technological advances have enabled the practical commercialisation of increasingly sophisticated portable devices, such as tablet PCs (including the Apple iPad), and smartphones. Smartphones, in particular, are mobile phones offering advanced computing capabilities and connectivity, which may be thought of as handheld computers integrated within a mobile telephone. Smartphones are particularly characterised in that the user is able to install and run a wide range of advanced applications, based on sophisticated operating system software that provides a platform for application developers. Popular smartphone operating system platforms include Symbian OS, the Blackberry OS, iOS (used by the Apple iPhone and iPad devices), Android, and the Windows Phone OS. Depending upon the device and operating system, third-party applications (commonly termed 'apps') may be widely available for download and installation, or may be available from device and/or OS specific services.

This evolution of mobile data services and devices has brought with it an increasing expectation of high-quality end-user experience. In particular, end-users expect apps to be responsive, accurate, consistent and to have a high availability. Given the ability of smartphones and other sophisticated mobile devices to run apps developed by third-party services providers, the end-user experience of such apps can have a significant impact upon their providers. For example, many banks make apps available for iOS and Android-based devices, in order to provide end-users with convenient access to online banking services. The convenience of mobile access may be desirable to many customers, however a poor quality end-user experience may result in customer dissatisfaction, low uptake of the mobile services, and/or lost business. It is therefore important for the operators of such services to have visibility of the performance of their mobile apps, and ideally to be able to monitor the end-user experience. However, the overall performance of any mobile application may depend upon the performance of a very large number of resources that are utilised by subscribers to the various services provided by the system. The resources that may influence overall performance include not only the radio channel itself, but also the shared fixed network services, communications services, Internet services (such as the Domain Name Service, DNS) and the various computing services within the service provider systems that are responsible for delivering the mobile application services.

Accordingly, the end-user experience in mobile systems may be influenced by numerous factors, not all of which may be within the full control of the mobile application service provider. It is therefore highly desirable to provide performance monitoring systems that are able to identify degradation in end-user experience that may lead to customer dissatisfaction and other adverse effects, and ideally assist in identifying the system resources that may be contributing to the degradation in service quality. Conversely, the ability to detect events, such as high traffic or processing loads within particular parts of the system, that are not actually impacting on end-user experience, is of limited value, and may in fact result in the inappropriate deployment of resources and expenditure. However, prior art performance monitoring systems have been unable to detect and respond to specific degradation in the end user experience of mobile applications.

Passive monitoring of system performance is one known approach, which essentially monitors available network statistics provided by various monitored resources or agents installed and executing therein. The basic information available through passive monitoring, such as throughput, response times, and so forth, is not necessarily indicative of any variation in the actual end-user experience. A more sophisticated approach, synthetic transaction monitoring, generally involves the generation (as the name suggests) of individual artificial transactions over the system, each of which is directed to one or more monitored resources, and measuring the performance, such as the response time, of such transactions. However, this type of monitoring fails to take into account the complex manner in which real users operate applications, which may generate sequences of interrelated transactions that may result in a different end-user experience than might be suggested by the results of measuring individual synthetic transactions. Users are primarily affected by the overall responsiveness of the application, and not by the performance of any particular individual transaction.

A system for monitoring and management of distributed information systems is disclosed in commonly assigned U.S. patent application Ser. No. 11/706,031, filed on 11 Aug. 2005, (now U.S. Pat. No. 7,953,847 B2, issued May 31, 2011) and which is hereby incorporated herein in its entirety by reference. The system described therein supports the monitoring of end-user experience and performance of applications, for example via remote control of user terminals, which is readily available for devices such as desktop PCs. However, the system is not directly applicable to mobile devices, which do not typically provide the rich set of features available on fixed computing devices, such as desktop PCs.

Accordingly, there exists a need for a method and system enabling a comparable level of monitoring of the end-user experience of mobile applications, to that which is available for fixed applications. It is an object of the present invention to address this need.

SUMMARY OF THE INVENTION

In one aspect the invention provides a method of obtaining end-user performance data associated with a target application executing on a mobile device within a distributed information system, the method comprising the steps of:

configuring the mobile device to support operation via a virtual execution environment executing on a remote server;

executing the target application on the mobile device;

performing at least one automated operation of the target application by emulating user actions within the virtual execution environment;

capturing one or more images of a target application graphical user interface responsive to said emulated user actions from within the virtual execution environment;

determining performance data of the target application by analysis of said images of the target application graphical user interface; and storing said performance data in a memory store.

Advantageously, embodiments of the invention enable information relating to performance and end-user experience of mobile applications to be acquired in a generic, device-independent, manner. This performance information can be integrated into a system for monitoring and management of distributed information systems, so that performance issues having an actual impact on the end-user experience of mobile application users may be more readily identified and diagnosed. Prior art monitoring and management solutions fail to provide the ability to incorporate the quality of end-user experience of mobile applications into the range of resources under management.

In another aspect, the invention provides a system for obtaining end-user performance data associated with a target application executing on a mobile device, the system comprising:

a management system server computer configured to comprise a virtual execution environment; and a mobile device configured to support operation of a target application executing thereon via the virtual execution environment, wherein the server computer comprises a microprocessor and at least one associated memory device which includes stored program instructions and associated data, which when executed by the microprocessor cause the server computer to execute the steps of:

performing at least one automated operation of the target application by emulating user actions within the virtual execution environment;

capturing one or more images of a target application graphical user interface responsive to said emulated user actions from within the virtual execution environment;

determining performance data of the target application by analysis of said images of the target application graphical user interface; and storing said performance data in a memory store.

In preferred embodiments, the mobile device and the management system server computer each comprise a corresponding network interface used for communication therebetween. In one embodiment, the mobile device includes a wireless LAN interface, such as a WiFi interface, providing connection to a corresponding wireless access point. Preferably, the management system server computer comprises a wired network interface, such as an Internet interface, which is connected to a wired port of the wireless access point.

The system may further include a wide area wireless network router device, such as a 3G router, for providing wireless access to a remote application service and emulating a corresponding wide area wireless interface of the mobile device.

Automated operation of the target application may comprise the execution of emulated key-press, touch-screen actions, voice commands, and so forth. Preferably, via the virtual execution environment, any type of input operation that can be represented as an input event to the target application may be emulated.

Analysis of captured images may comprise capturing one or more images, and analysing the images to detect a response to the emulated user actions. Response data that may be determined by analysis of image frames includes:

whether there is any response to the action, i.e. availability of the mobile application;

latency between an emulated action and a corresponding response; and whether a response to the emulated action is an expected response or an unexpected response.

Data gathered by the analysis of images captured from the virtual environment may be used to compute derived performance indicators of the system, including the mobile application.

In a preferred embodiment, sequences of images are processed to generate a digital video recording of emulated actions and corresponding responses. The processing may be include coding of the video sequences into a compressed format, such as MPEG-2 video or MPEG-4 video.

Advantageously, stored video sequences may be played in real-time, for example on a system management console, and/or may be stored for later retrieval and viewing. Accordingly, in the event that degradation in mobile application performance is identified by the information system management and monitoring system, an operator is able to actually retrieve and review the specific degradation in responsiveness and/or end-user experience that occurred within the mobile application.

Further preferred features and advantages of the present invention will be apparent to those skilled in the art from the following description of preferred embodiments of the invention. It will be understood, however, that the preferred embodiments are not limiting of the scope of the invention as defined in any of the preceding statements, or in the claims appended hereto.

BRIEF DESCRIPTION OF THE DRAWINGS

A preferred embodiment will now be described with reference to the accompanying drawings, wherein like reference numerals represent like features, and in which.

DETAILED DESCRIPTION OF PREFERRED EMBODIMENT

Figure 1:
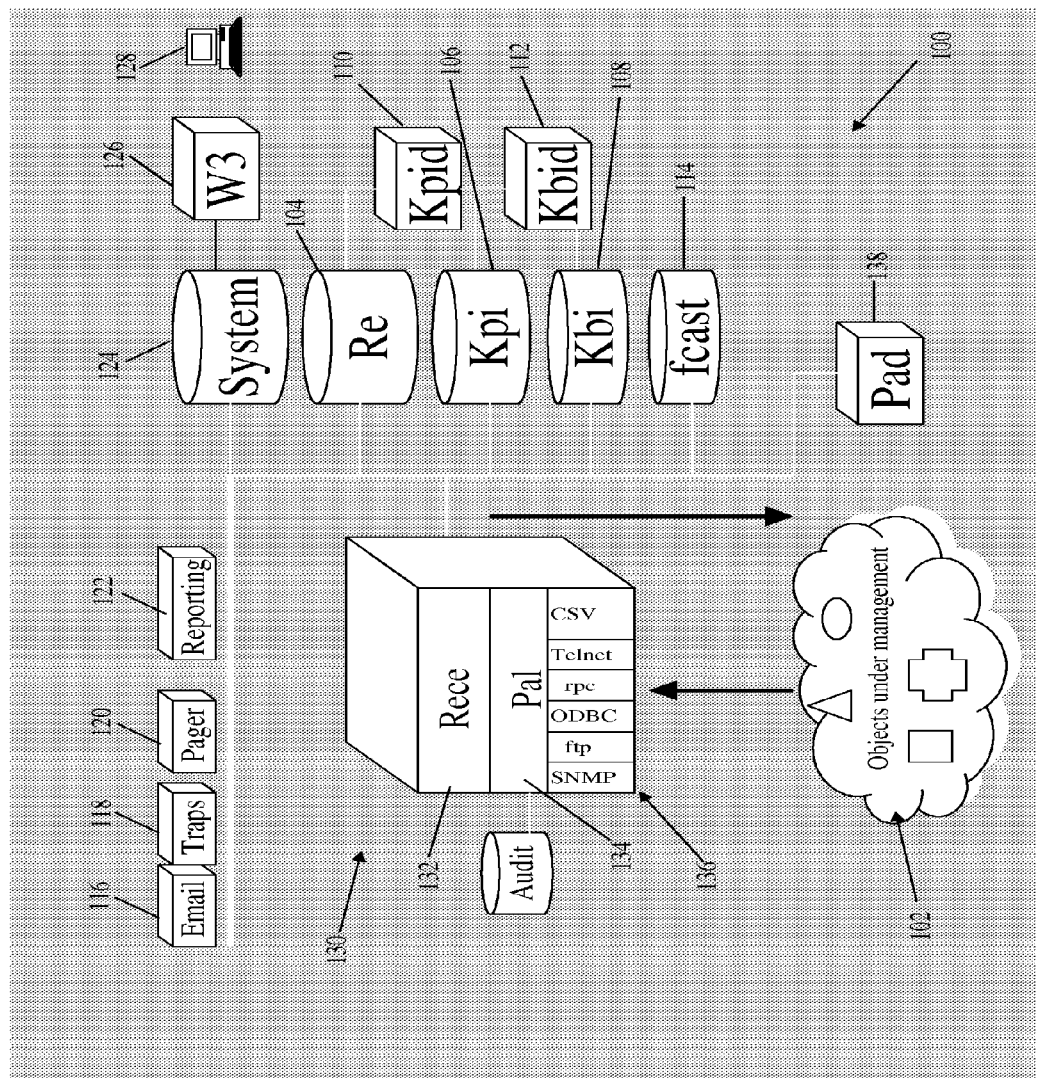
FIG. 1 is a schematic diagram of a system architecture of a management system embodying the invention.
Figure 2:
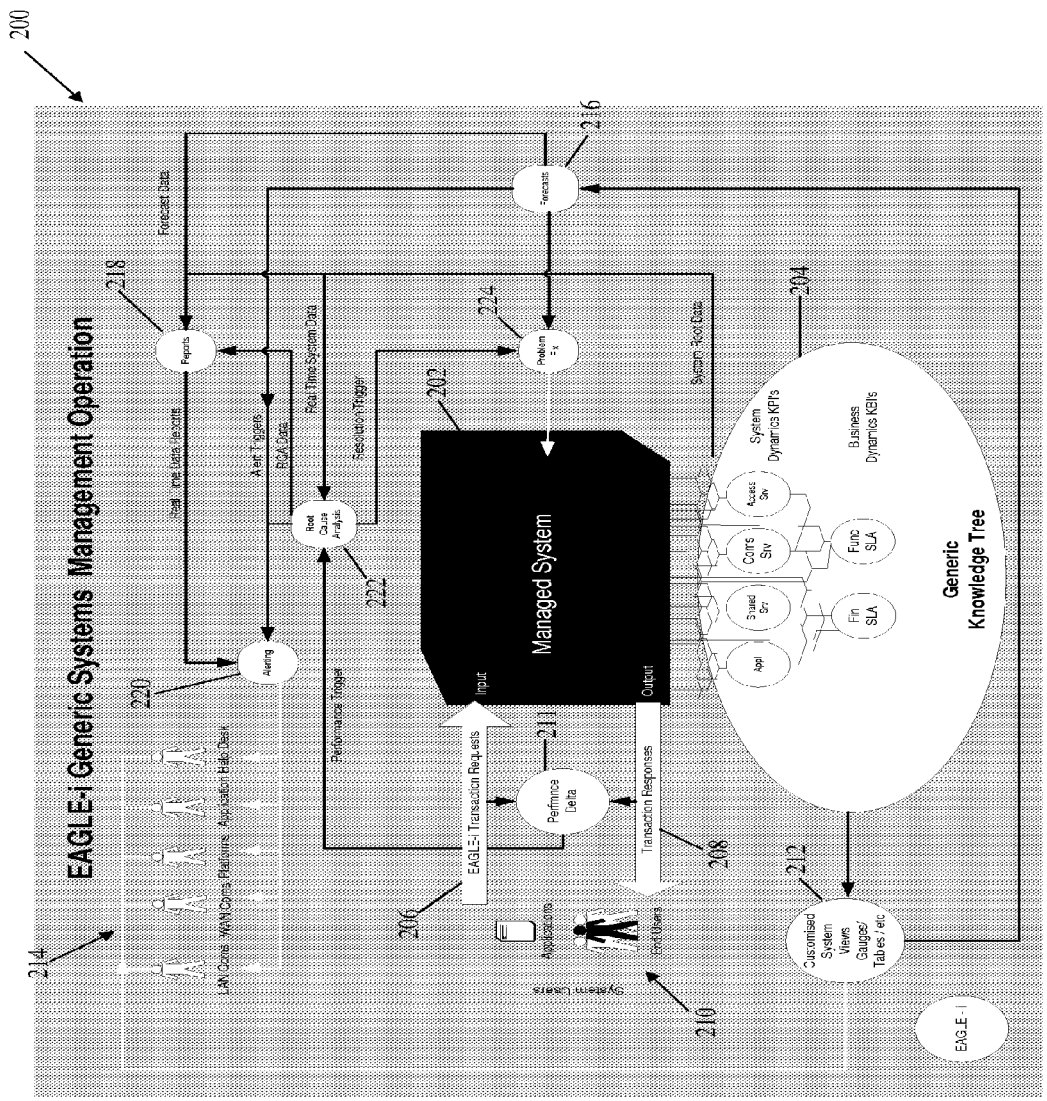
FIG. 2 is a schematic diagram of the systems management operation of the management system illustrated in FIG. 1.
Figure 3:
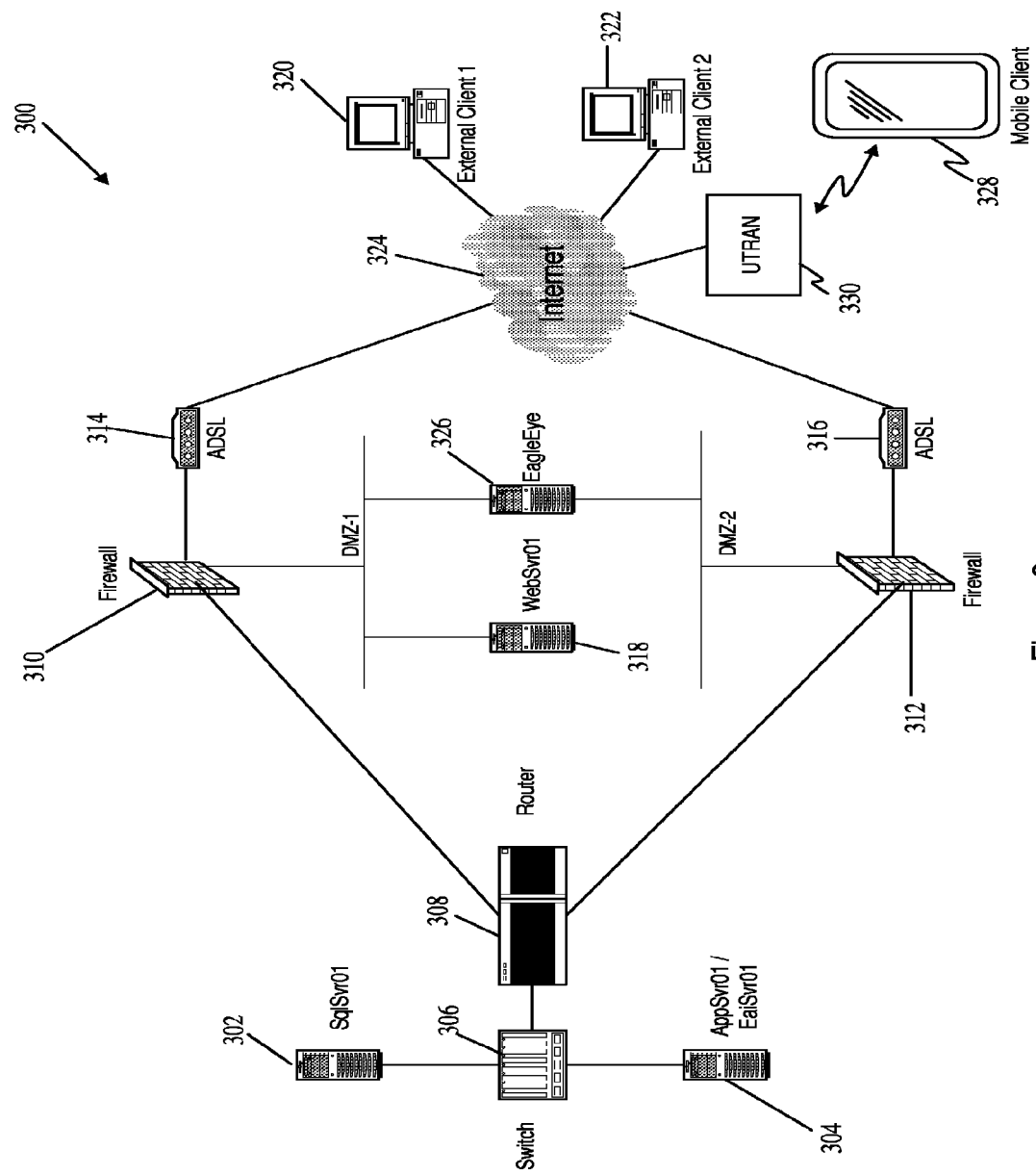
FIG. 3 shows schematically an example of an information system, including a mobile client device, in accordance with a preferred embodiment of the invention.

FIGS. 1, 2 and 3 illustrate schematically a management system architecture, the management operation software architecture, and an exemplary managed system, embodying the present invention.

A more-detailed disclosure of the operation of the management system 100 illustrated in FIG. 1 may be found in the specification of the commonly assigned U.S. Pat. No. 7,953, 847 B2. Accordingly, only those details pertinent to the implementation and operation of mobile application monitoring embodying the present invention will be described herein, the further details of the management system being incorporated in their entirety from the aforementioned US patent specification by reference.

FIG. 1 shows a schematic diagram of the architecture 100 of a management system according to a preferred embodiment. The management system is managing a distributed computer system, represented by a collection of objects under management 102. The managed objects 102 typically include applications, computing resources, network resources, and other software and hardware resources making up the system under management. In embodiments of the present invention the managed objects include one or more applications and other resources executing on at least one mobile device The management system 100 collects management information relevant to the performance of the information system from the objects under management 102. The management information typically consists of various performance metrics and other status data maintained by the resources in the system. This data is gathered from the managed resources, including mobile devices and applications, using a heterogenous range of protocols. The basic data obtainable from the objects under management 102 is called Raw Element (RE) information, which is collected and stored in a Raw Elements database 104.

Expert knowledge of the system under management is embodied in performance indicators that may be understood as abstractions of the raw management information available from the objects under management 102. In a preferred embodiment, a distinction is made between two types of performance indicator. These are key performance indicators (KPIs) that generally represent aspects of the technical performance of an information system, and which are stored in a KPI database 106, and key business indicators (KBIs), which generally represent measures of the performance of the system relative to business objectives, and which are stored in a KBI database 108.

A database of forecast information 114 includes forecasted values of any selected raw elements, KPIs, and KBIs. Reporting processes are preferably provided, including process 116 for sending email reports to operators, process 118 for generating traps relating to events that occur in the system, process 120 for generating pager alerts and alarms, and process 112 for providing general reporting of the status and performance of the management system, as well as the system under management.

A system database 124 defines the initial state of the system and maintains the system's operational state. Functions and information maintained by system database 124 include a job scheduler, job definitions, performance indicator (KPI and KBI) definitions, alert definitions, user definitions, system normalisation data, and definitions used by a proactive correction engine 138.

Preferably, a web server process 126 is provided, enabling the system to be remotely accessed and operated using a web browser running on any desktop PC, e.g. 128.

An object management module 130 includes a Raw Element Collection Engine (RECE) 132, a Protocol Abstraction Layer (PAL) 134, and various protocol modules 136 that may be used to communicate and gather information from the objects under management 102. The provision of multiple protocol interfaces 136 and the protocol abstraction layer 134 provides the management system 100 with the ability to manage any type of object without reliance upon intrusive agents or limited and unreliable SNMP MIB information. The specific means and methods employed in preferred embodiments of the invention, for obtaining data from mobile devices and applications, are described below with reference to FIGS. 4, 5 and 6.

The RECE 132 coordinates the collection of management information from the objects under management 102. The RECE 132 incorporates a job scheduler that runs specified collection jobs at predetermined intervals. Accordingly, each RE has a corresponding resolution period, being the interval between executions of the jobs that is responsible for correcting the RE.

A proactive correction engine 138 is preferably included, to detect possible faults in the system under management, and take corrective action where possible.

Turning now to FIG. 2, there is shown a schematic diagram of the system management operation 200 of the preferred embodiment of the invention. The management system is configured to manage an information system 202. The preferred embodiment of the invention includes a 'knowledge tree' 204, which is a knowledge base having a hierarchical conceptual structure that may embody a substantial amount of expert knowledge relating to the system under management 202. The knowledge tree 204 may be understood to embody a management model of the managed information system 202, which may be configured using expert knowledge of the managed information system 202.

The management operation of the preferred embodiment includes generating transaction requests 206 to the information system under management 202, and monitoring the performance of the system in providing corresponding transaction responses 208. The generation of transaction requests may be carried out under the control of the job scheduler in the RECE 132. It is desirable that transaction requests be generated from applications and end-users 210 of the managed information system 202, to ensure that the transaction performance of the managed system 202 reflects the actual performance experienced by end-users in relation to the profile of tasks usually required by the end-users. Various methods for generating such transaction requests in relation to fixed infrastructure and resources, such as servers and desktop client computers, are described in greater detail in commonly assigned U.S. Pat. No. 7,953,847 B2. Means and methods embodying the present invention are described below with reference to FIGS. 4 to 6.

Any changes in performance, represented by performance delta 211 in the management operation diagram 200, may thereby be detected. Accordingly, degradations in end-user performance and/or experience may be identified and used to trigger an analysis 222 of the root causes of such performance degradation. A particular advantage of the preferred embodiment of the management system 100 is that identification and analysis of problems in the managed information system 202 is triggered by actual degradation in end-user application performance and experience. Unnecessary analysis, and false detection of problems that may not be reflected in any degradation in performance of the system 202, from the end-user perspective, may thereby be avoided.

The preferred embodiment of the management system 100 is also able to provide customised system views 212 of the managed information system 202 to operators and managers 214 of the information system 202. The customised system views may include various graphical representations of system performance indicators, such as gauges, tables and the like. It is also possible, in preferred embodiments of the present invention, to provide an operator with a video playback of actions leading up to, and during, an end-user experience degradation event.

Particular views of the system may incorporate forecasts 216 of pre-detected system performance, which may be based upon past performance of the system. The forecast data may be provided for the purposes of report generation 218, and for generating real-time alerts 220 to potential problems in the managed information system 202. When problems arise the forecasts 216 and results of root cause analysis 222 may be used to identify a possible automated correction for the problem 224.

FIG. 3 illustrates an example of an information system 300 under management in accordance with a preferred embodiment of the invention. The exemplary information system 300 includes database server 302 and application server 304 connected via a network switch 306 to an Internet router 308. These critical enterprise components are protected by firewalls 310, 312 and have redundant connections 314, 316 to the Internet 324.

A web server 318 is provided outside firewalls 310, 312 in order to provide access to the information system by external clients, e.g. 320, 322 via the Internet 324.

The management system executes on server 326, which may comprise one or more computers each having one or more microprocessors and associated peripherals, such as network interfaces for connection to the system under management, and volatile and non-volatile storage (e.g. system memory and storage media such as hard disk drives) for the storage, loading and execution of programs and data implementing an embodiment of the invention.

Steps carried out in order to bring the information system 300 under the management of the management system executing on server 326, and further aspects of the ongoing operation of the management system, are described in greater detail in commonly assigned U.S. Pat. No. 7,953,847 B2, and will therefore not be repeated herein.

In addition to the fixed external clients 320, 322, the system 300 also includes a mobile access network 330 which provides access to the Internet 324 to a range of mobile clients, such as smartphone 328. In a common 3G implementation, the mobile access network 330 comprises a Universal Mobile Telecommunications System (UMTS) Terrestrial Radio Access Network (UTRAN). However, other mobile data access networks may be employed.

Figure 4:
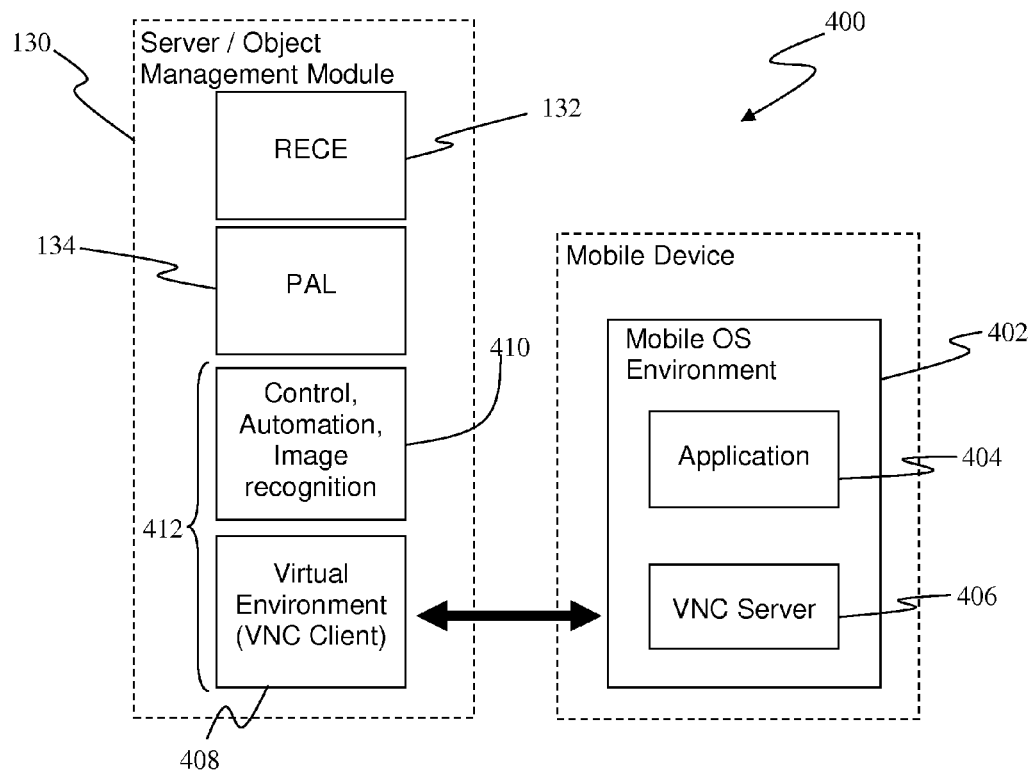
FIG. 4 illustrates a software architecture of a performance monitoring system for mobile applications embodying the invention.

Turning now to FIG. 4, there is shown a software architecture diagram 400 embodying the present invention. A mobile device 328 comprises an operating system platform 402 supporting the execution of one or more mobile apps 404. For many smartphone platforms, a very large number of mobile apps is available for users to download, install and execute. A representative example is a mobile app provided by a bank, providing a customer with access to online banking facilities via a mobile device 328. The performance of such a mobile app depends upon the performance of the relevant server systems within the bank's networks, and also upon all of the intervening network components between the bank's servers and the mobile device 328. It is therefore desirable to monitor the end-user experience delivered by the mobile app 404, along with the other resources within the complete information system.

To enable monitoring of the end-user experience, embodiments of the present invention bring the app 404 under remote control of the object management module 130. In one embodiment, this is achieved by installing a Virtual Network Computing (VNC) server 406 within the operating system platform environment 402 of the mobile device 328.

A remote virtual environment, in the form of a VNC client 408, executes as an element of a protocol module within the object management module 130.

As will be appreciated by those skilled in the relevant art, the VNC system, comprising the server 406 and client 408, is based upon the open Remote Frame Buffer (RFB) protocol, and a range of suitable server and client implementations are available, or may be developed based upon the RFB protocol specification.

A further module 410 implements control and automation of the remote mobile app 404 via the VNC client 408 and VNC server 406. The control and automation module 410 is able to execute any sequence of common user interactions with the mobile app 404, by generating appropriate input events via the VNC system 406, 408.

The control and automation module 410 also includes an image recognition component. In particular, the RFB protocol returns a copy of the frame from within the mobile operating system environment 402, which contains a bitmap corresponding with the display of the mobile device 328. The frame buffer images can be analyzed in order to identify the presence of expected user interface elements. The control and automation module 410 is thus able to determine a range of relevant measures of performance and end-user experience of the mobile app 404. For example, the delay between providing input to the app 404 and an anticipated response, such as an update of the display with requested information, may be measured. The failure of an input action to produce an expected or desired response may also be detected.

Performance information gathered by the control and automation module 410 is passed to the PAL 134 for further processing by the management system 100. In a typical embodiment, the user experience and performance data comprises REs that are available as input for computing relevant KPIs and KBIs within the monitoring and management system.

Figure 5:
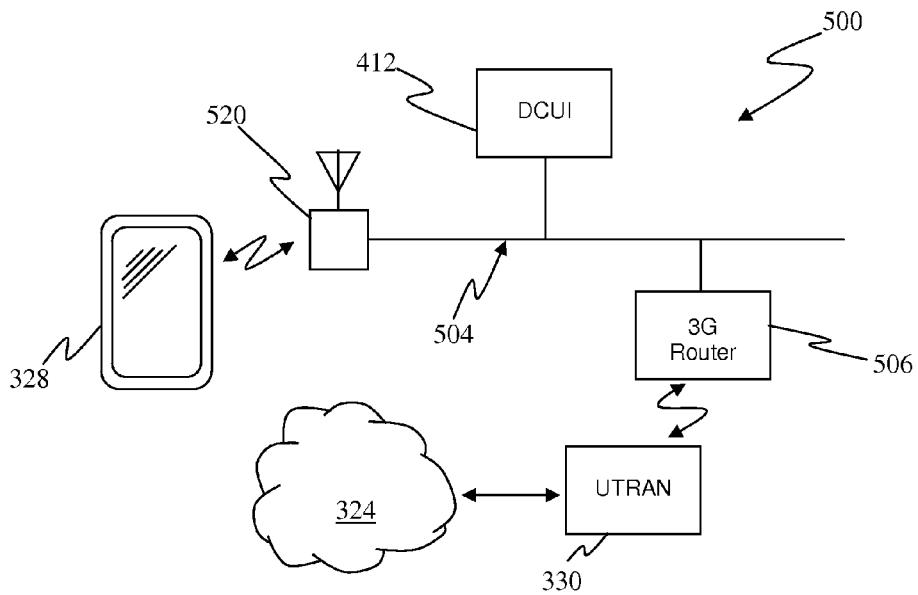
FIG. 5 is a block diagram illustrating a preferred embodiment of a system configuration for monitoring performance of a mobile application.

FIG. 5 is a block diagram illustrating an exemplary embodiment of a specific system configuration 500 for monitoring the performance of a mobile application executing on a mobile device 328. The configuration 500 is particularly designed to accommodate monitoring application performance on a mobile device that supports access via a Wireless Local Area Network (WLAN), or WiFi, interface, as well as a wide area mobile cellular interface, such as 3G. Such devices typically connect either via WLAN or via 3G, but not both simultaneously.

The monitoring system configuration 500 is designed to support the software architecture 400, described above with reference to FIG. 4. A wireless access point 520 supports WiFi access via the mobile device 328. The wireless access point 520 is connected to a wired Local Area Network (LAN) 504, such as an Internet network. A virtual Data Collection User Interface (DCUI) 412, comprising the VNC client 408 and control and automation module 410, executes within a server connected to the LAN 504. This enables monitoring of the end-user experience of the mobile app 404. A 3G router 506 is also connected to the LAN 504, which connects via the UTRAN 330, and other elements of the mobile service provider network, to the Internet 324. The DCUI 412 is thus able to monitor the end-user experience of the mobile client app 404, including the impact of the 3G network 330, any relevant Internet services, and the service provider information systems providing the mobile application service, such as (for example) a mobile online banking service.

Figure 6:
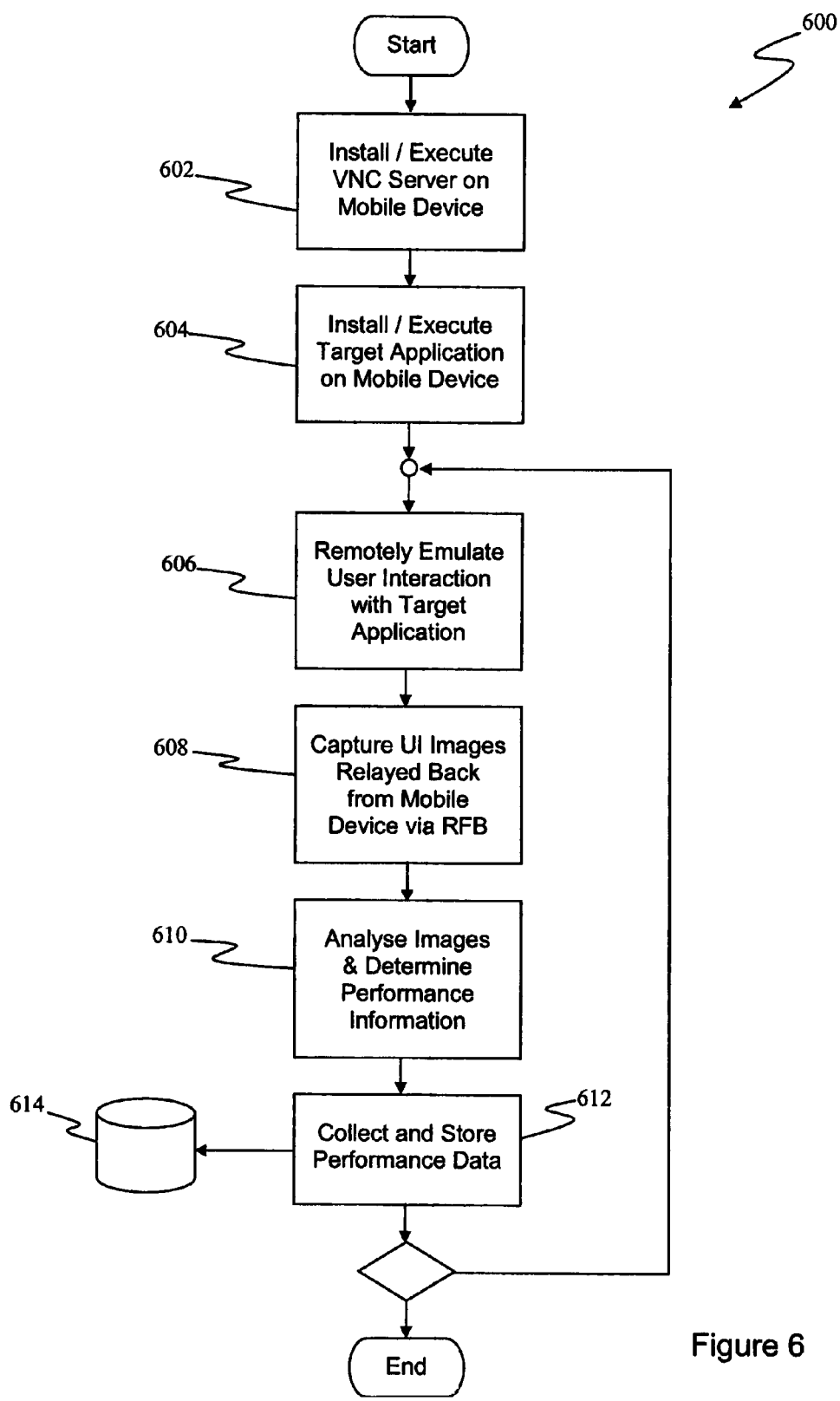
FIG. 6 is a flowchart illustrating a process for monitoring performance of a mobile application according to a preferred embodiment of the invention.

FIG. 6 is a flowchart 600 illustrating a process, embodied by the software and hardware systems described above, for monitoring the end-user performance of a mobile application.

The process 600 comprises firstly providing a mobile device 328, and installing a VNC server within the mobile operating system environment 402. The mobile app 404, the performance of which is to be monitored, is then executed at step 604.

Monitoring of the end-user performance of the mobile app 404 comprises driving the mobile app remotely using the RFB protocol, represented by step 606. The RFB protocol enables user input events to be sent to the mobile app 404, and returns corresponding frame-buffer images representing the mobile device display, at step 608.

At step 610, the captured user interface images are analyzed to determine relevant performance data of the mobile app 404. At step 612, the data is collected and stored within a database 614.

For continuous monitoring of application performance, the process then returns to step 606.

It is also possible to store and process sequences of user interface images returned from the mobile device 328 at step 608. Sequences of images may be processed to create playable video files of the remotely automated operation of the mobile app 404. At any time, these video sequences may be played back, in order to provide an operator with an effective visual records of the precise nature of the end-user experience of the app 404. Where any performance degradation is detected, the actual impact on a user of the mobile app may be observed by viewing the corresponding video sequence.

In conclusion, methods, systems and software components have been described that are uniquely able to bring an application executing on a mobile device, such as a smartphone, into the framework provided by a sophisticated information system management and monitoring platform, such as that disclosed in the commonly assigned U.S. Pat. No. 7,953,847 B2. This novel development enables, for the first time to the inventor's knowledge, monitoring of the most important aspects of system performance, namely the actual end-user experience, in the context of widely deployed mobile applications.

While particular preferred embodiments of the invention have been described, it will be appreciated that many variations to these embodiments are possible, and within the capabilities of the person skilled in the art, such as the use of different software platforms, different hardware and network technologies, and so forth. As such, the disclosed embodiments are not to be taken as limiting of the scope of the invention, which is defined by the claims appended hereto.

The invention claimed is:

1. A method of obtaining end-user performance data associated with a target application executing on a mobile device within a live distributed information system that comprises a plurality of application server resources located remotely from the mobile device and accessible via one or more data communications networks, the method comprising:

configuring the mobile device to support operation via a virtual execution environment executing on a remote management system server that is distinct from the application server resources;

executing the target application on the mobile device;

emulating a user action within the virtual execution environment so as to initiate at least one automated interaction comprising:

an application service request sent from the target application executing on the mobile device via the one or more data communications networks to associated service resources comprising any one or more of the plurality of application server resources located remotely from the mobile device, and at least one corresponding application service response sent from the associated service resources via the one or more data communications networks to the target application executing on the mobile device;

capturing one or more images of a target application graphical user interface responsive to said emulated user action from within the virtual execution environment;

determining performance data of the interaction between the target application and the associated service resources by analysis of said one or more images of the target application graphical user interface, the performance data comprising a total elapsed time between emulating the user action and an update of the target application graphical user interface resulting from receipt of the at least one corresponding application service response by the target application executing on the mobile device; and storing said performance data in a memory store.

2. The method of claim 1, further comprising using data gathered by the analysis of the one or more images captured from the virtual environment to compute one or more derived performance indicators of the distributed information system, including the mobile device.

3. The method of claim 1, wherein the one or more images comprises a plurality of images, the method further comprising processing a sequence of the plurality of images to generate a digital video recording of emulated actions and corresponding responses.

4. The method of claim 3, further comprising playing said digital video recording in real-time.

5. A system for obtaining end-user performance data associated with a target application executing on a mobile device within a live distributed information system that comprises a plurality of application server resources located remotely from the mobile device and accessible via one or more data communications networks, the system comprising:

a management system server computer that is distinct from the application server resources, and configured to include a virtual execution environment; and the mobile device configured to support operation of the target application executing thereon via the virtual execution environment, wherein the management system server computer comprises a microprocessor and at least one associated memory device storing program instructions and associated data, which when executed by the microprocessor cause the management system server computer to perform at least the following:

emulate user actions within the virtual execution environment so as to initiate at least one automated interaction comprising:

an application service request sent from the target application executing on the mobile device via the one or more data communications networks to associated service resources comprising any one or more of the plurality of application server resources located remotely from the mobile device; and at least one corresponding application service response sent from the associated service resources via the one or more data communications networks to the target application executing on the mobile device;

capture one or more images of a target application graphical user interface responsive to said emulated user actions from within the virtual execution environment;

determine performance data of the interaction between the target application and the associated service resources by analysis of said one or more images of the target application graphical user interface, the performance data comprising a total elapsed time between emulating the user action and an update of the target application graphical user interface resulting from receipt of the at least one corresponding application service response by the target application executing on the mobile device; and store said performance data in a memory store.

6. The system of claim 5, wherein the mobile device comprises a wireless LAN interface providing connection to a wireless access point and the management system server computer comprises a wired network interface that is connected to a wired port of the wireless access point.

7. The system of claim 6, further comprising a wide area wireless network router device configured to provide wireless access to a remote application service and to emulate a wide area wireless interface of the mobile device.

8. The system of claim 7, wherein the wide area wireless network router device is a 3G router.

9. The method of claim 4, further comprising playing the video recording in real-time on a management console located remotely from the mobile device.

10. The method of claim 3, further comprising storing said video recording for later retrieval and viewing.

11. A method, comprising:
emulating a user action within a virtual execution environment executing on a management system server of a live distributed information system so as to initiate at least one automated interaction between a target application executing on a mobile device and associated service resources comprising any one or more of a plurality of application server resources distinct from the management system server and located remotely from the mobile device, wherein the automated interaction comprises:
an application service request sent from the target application executing on the mobile device via one or more data communications networks to the associated service resources; and
at least one corresponding application service response sent from the associated service resources via the one or more data communications networks to the target application executing on the mobile device;
capturing one or more images of a target application graphical user interface responsive to said emulated user action from within the virtual execution environment;
determining performance data of the interaction between the target application and the associated service resources within the distributed information system by analysis of said one or more images of the target application graphical user interface, the performance data comprising a total elapsed time between emulating the user action and an update of the target application graphical user interface resulting from receipt of the at least one corresponding application service response by the target application executing on the mobile device; and
storing said performance data in a memory store.

12. The method of claim 11, further comprising using data gathered by the analysis of the one or more images to determine a performance indicator of the distributed information system.

13. The method of claim 11, wherein the one or more images comprises a plurality of images, the method further comprising processing a sequence of the plurality of images to generate a digital video recording of the emulated user action and one or more corresponding responses to the emulated user action.

* * * * *